United States Patent
Chen et al.

(10) Patent No.: US 12,254,236 B2
(45) Date of Patent: Mar. 18, 2025

(54) VIDEO TRANSMISSION METHOD AND DISPLAY

(71) Applicant: Wistron Corporation, New Taipei (TW)

(72) Inventors: Jiasheng Chen, New Taipei (TW); Junxin Qiu, New Taipei (TW); Yongqiang Li, New Taipei (TW)

(73) Assignee: Wistron Corporation, New Taipei (TW)

( * ) Notice: Subject to any disclaimer, the term of this patent is extended or adjusted under 35 U.S.C. 154(b) by 59 days.

(21) Appl. No.: 18/326,011

(22) Filed: May 31, 2023

(65) Prior Publication Data
US 2024/0345794 A1    Oct. 17, 2024

(30) Foreign Application Priority Data
Apr. 14, 2023   (CN) .......................... 202310407383.3

(51) Int. Cl.
*G06F 3/147* (2006.01)
*H04N 21/4402* (2011.01)
*H04N 21/442* (2011.01)

(52) U.S. Cl.
CPC ..... *G06F 3/147* (2013.01); *H04N 21/440263* (2013.01); *H04N 21/44245* (2013.01)

(58) Field of Classification Search
CPC ........ G06F 3/147; G09G 5/005; G09G 5/006; H04N 21/440263; H04N 21/44245
See application file for complete search history.

(56) References Cited

U.S. PATENT DOCUMENTS

| | | | | |
|---|---|---|---|---|
| 6,148,005 A * | 11/2000 | Paul | ............... | H04N 21/234327 348/E7.071 |
| 6,233,283 B1 * | 5/2001 | Chiu | .................... | H04N 19/115 375/E7.091 |
| 7,432,932 B2 * | 10/2008 | San | ........................ | G06F 9/3802 712/E9.055 |
| 7,849,491 B2 * | 12/2010 | Perlman | ................. | A63F 13/355 463/40 |
| 8,147,339 B1 * | 4/2012 | Perry | .................... | A63F 13/355 463/31 |
| 8,396,122 B1 * | 3/2013 | Taylor | .................. | H04N 19/436 375/240.03 |
| 8,500,558 B2 * | 8/2013 | Smith | ...................... | A63F 13/92 463/31 |
| 8,537,899 B1 * | 9/2013 | Taylor | .................. | H04N 19/625 382/250 |
| 2004/0261113 A1 * | 12/2004 | Paul | ............... | H04N 21/234327 725/135 |

(Continued)

*Primary Examiner* — Michael B. Pierorazio
(74) *Attorney, Agent, or Firm* — JCIPRNET (57) ABSTRACT

A video transmission method and a display are provided. In the method, a first bandwidth of a video stream inputted into a display is detected. The display includes a scaling controller and a timing controller. The first bandwidth is compared with a second bandwidth used by the scaling controller and the timing controller to obtain a comparison result between the first bandwidth and the second bandwidth. The second bandwidth is changed to a third bandwidth according to the comparison result. The third bandwidth is used for a transmission of the video stream. Accordingly, bandwidth waste and power consumption may be reduced.

20 Claims, 8 Drawing Sheets

(56) References Cited

U.S. PATENT DOCUMENTS

| | | | |
|---|---|---|---|
| 2008/0297544 A1* | 12/2008 | Huang | G09G 5/18 345/3.4 |
| 2009/0119736 A1* | 5/2009 | Perlman | A63F 13/355 725/133 |
| 2009/0125961 A1* | 5/2009 | Perlman | H04N 21/8186 725/112 |
| 2009/0125967 A1* | 5/2009 | Perlman | H04N 19/154 725/133 |
| 2009/0144448 A1* | 6/2009 | Smith | A63F 13/52 709/246 |
| 2010/0007582 A1* | 1/2010 | Zalewski | A63F 13/00 345/8 |
| 2010/0167809 A1* | 7/2010 | Perlman | H04N 19/107 463/43 |
| 2010/0273553 A1* | 10/2010 | Zalewski | H04N 21/235 463/31 |
| 2010/0285879 A1* | 11/2010 | Huang | A63F 13/211 463/36 |
| 2010/0285883 A1* | 11/2010 | Zalewski | A63F 13/428 463/39 |
| 2010/0304868 A1* | 12/2010 | Zalewski | A63F 13/24 463/38 |
| 2010/0306402 A1* | 12/2010 | Russell | H04L 65/1089 709/230 |
| 2011/0086706 A1* | 4/2011 | Zalewski | G06F 3/017 463/36 |
| 2011/0092291 A1* | 4/2011 | Perlman | A63F 13/352 463/40 |
| 2011/0118032 A1* | 5/2011 | Zalewski | A63F 13/215 463/43 |
| 2011/0124410 A1* | 5/2011 | Mao | A63F 13/211 463/31 |
| 2011/0195782 A1* | 8/2011 | Mao | A63F 13/25 463/37 |
| 2011/0216002 A1* | 9/2011 | Weising | A63F 13/92 345/158 |
| 2011/0216060 A1* | 9/2011 | Weising | A63F 13/00 345/419 |
| 2011/0260830 A1* | 10/2011 | Weising | A63F 13/40 340/5.52 |
| 2011/0304713 A1* | 12/2011 | Tardif | G06F 3/1423 348/54 |
| 2012/0258800 A1* | 10/2012 | Mikhailov | A63F 13/285 463/36 |
| 2012/0306907 A1* | 12/2012 | Huston | G06V 20/20 345/619 |
| 2012/0327113 A1* | 12/2012 | Huston | H04W 4/021 345/632 |
| 2012/0331058 A1* | 12/2012 | Huston | H04W 4/20 709/204 |
| 2013/0038618 A1* | 2/2013 | Urbach | G06F 9/5005 345/522 |
| 2013/0072301 A1* | 3/2013 | Mallinson | A63F 13/211 463/36 |
| 2013/0106855 A1* | 5/2013 | Urbach | G06T 15/08 345/424 |
| 2013/0132510 A1* | 5/2013 | Ye | H04N 21/2343 709/217 |
| 2013/0178293 A1* | 7/2013 | Nakayama | A63F 13/213 463/37 |
| 2013/0212162 A1* | 8/2013 | Somadder | H04L 67/565 709/203 |
| 2013/0260896 A1* | 10/2013 | Miura | A63F 13/47 463/42 |
| 2013/0268573 A1* | 10/2013 | Lee | H04N 21/4424 709/201 |
| 2013/0296052 A1* | 11/2013 | Smith | A63F 13/31 463/31 |
| 2017/0270841 A1* | 9/2017 | An | G09G 5/005 |
| 2022/0319372 A1* | 10/2022 | Lee | G09G 5/006 |

* cited by examiner

VIDEO TRANSMISSION METHOD AND DISPLAY

CROSS-REFERENCE TO RELATED APPLICATION

This application claims the priority benefit of China application serial no. 202310407383.3, filed on Apr. 14, 2023. The entirety of the above-mentioned patent application is hereby incorporated by reference herein and made a part of this specification.

BACKGROUND OF THE INVENTION

Field of the Invention

The invention relates to a display technique, and in particular to a video transmission method and a display.

Description of Related Art

With the development of display techniques, high resolution and high update rate have become important requirements for businesses such as film and television, games, and remote office. However, the high power consumption caused by the high transmission bandwidth of the display inevitably affects the life of the product and also may not meet the industry's testing standards (for example, Energy star 8.0 of the US Environmental Protection Agency or ErP Lot5 of the European Union's energy efficiency), and further causes a waste of environmental resources.

SUMMARY OF THE INVENTION

Embodiments of the invention provide a video transmission method and a display that may dynamically adjust transmission bandwidth to reduce power consumption of the display.

A video transmission method of an embodiment of the invention is adapted for a display. The video transmission method includes (but not limited to) the following steps: detecting a first bandwidth of a video stream inputted into the display. The display includes a timing controller and a scaling controller. The first bandwidth is compared with a second bandwidth used by the timing controller and the scaling controller to obtain a comparison result between the first bandwidth and the second bandwidth. The second bandwidth is changed to a third bandwidth according to the comparison result. The third bandwidth is used for a transmission of the video stream.

A display of an embodiment of the invention includes a scaling controller and a timing controller. The scaling controller is coupled to the timing controller. The scaling controller is used to detect a first bandwidth of a video stream inputted into the display and compare the first bandwidth with a second bandwidth used by the timing controller and the scaling controller to obtain a comparison result of the first bandwidth and the second bandwidth. The timing controller is used to change the second bandwidth to a third bandwidth according to the comparison result. The third bandwidth is used for a transmission of the video stream.

Based on the above, the video transmission method and the display according to the embodiments of the invention may detect the current bandwidth of the video stream, and change the bandwidth used by the transmission interface in response to the change of the bandwidth of the video stream. In this way, for a video stream with lower bandwidth requirements, the bandwidth used for transmission may be reduced, so as to reduce power consumption and meet specified standards.

In order to make the aforementioned features and advantages of the disclosure more comprehensible, embodiments accompanied with figures are described in detail below.

DESCRIPTION OF THE EMBODIMENTS

Figure 1:
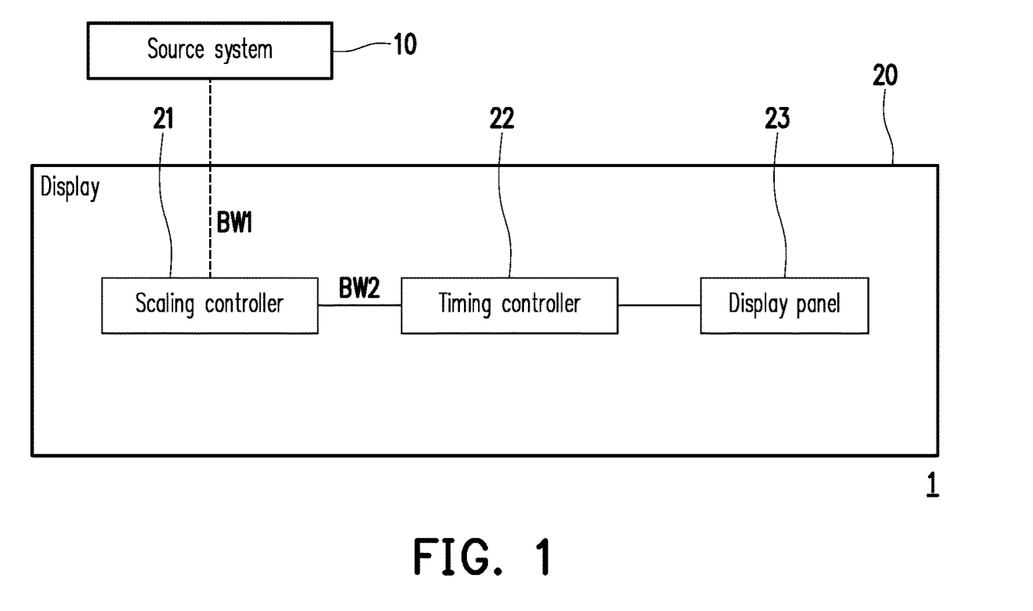
FIG. 1 is a block diagram of elements of a computer system according to an embodiment of the invention.

FIG. 1 is a block diagram of elements of a computer system 1 according to an embodiment of the invention. Referring to FIG. 1, a computer system 1 may be a desktop computer, a notebook computer, a server, a smart phone, a tablet computer, a wearable device, an intelligent assistant device, a smart home appliance, or a vehicle system.

The computer system 1 includes (but not limited to) a source system 10 and a display 20.

The source system 10 is the host of the computer system 1. The source system 10 may include (but not limited to) a video or graphics processing circuit, and is used to output a video stream.

The display 20 includes (but not limited to) a scaling controller 21, a timing controller (TCON) 22, and a display panel 23.

The scaling controller 21 is coupled to the timing controller 22 and the source system 10. The scaling controller 21 and the timing controller 22 may be implemented by a programmable general-purpose or special-purpose microprocessor, digital signal processor (DSP), programmable controller, field-programmable gate array (FPGA), or application-specific integrated circuit (ASIC).

In an embodiment, the scaling controller 21 is used to perform scaling processing on the image of the video stream, so that the resolution of the image conforms to the specification of the display panel 23.

In an embodiment, the timing controller 22 is used to determine the sequence and timing of the pixel behavior of the display panel 23.

The display panel 23 is coupled to the timing controller 22. The display panel 23 may be a liquid-crystal display (LCD) panel, a light-emitting diode (LED) display panel, or an organic light-emitting diode (OLED) display panel. In an embodiment, the display panel 23 is used to display an image.

Hereinafter, the method described in an embodiment of the invention is described in conjunction with each device and/or element in the computer system 1. Each process of the method in an embodiment of the invention may be adjusted according to the implementation situation, and is not limited thereto.

Figure 2:
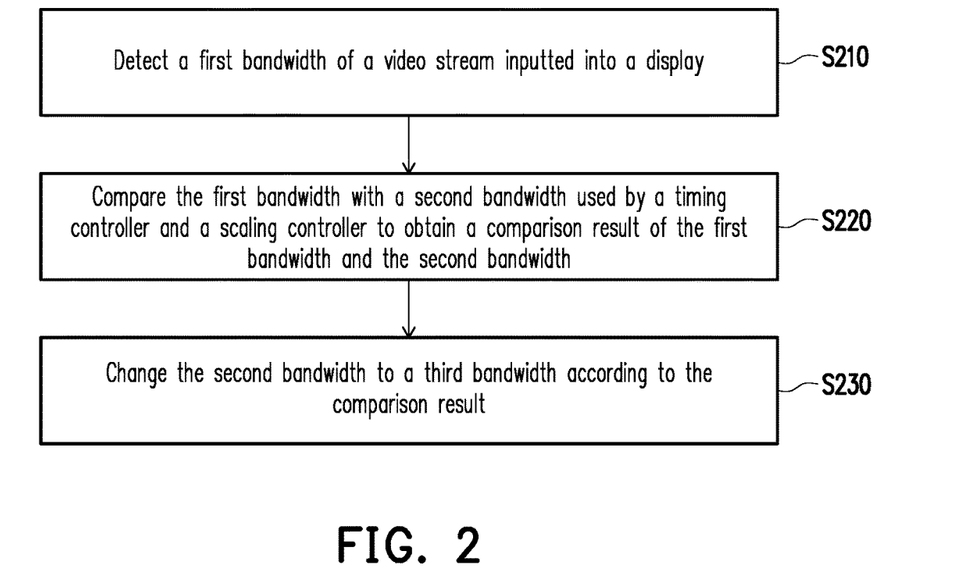
FIG. 2 is a flowchart of a video transmission method according to an embodiment of the invention.

FIG. 2 is a flowchart of a video transmission method according to an embodiment of the invention. Referring to FIG. 2, the scaling controller 21 detects a first bandwidth BW1 of a video stream inputted into the display 20 (step S210). Specifically, an Embedded DisplayPort (eDP) is a mainstream internal video transmission protocol in the current market, and may be applied to the communication between the scaling controller 21 and the timing controller 22. The basic architecture of the eDP protocol includes main link, auxiliary channel (AUX CH), and link training. The main link is used to transmit a video stream. The main link may include 1 to 4 lanes, and each lane may be configured with a transmission bandwidth specification such as high bit rate (HBR), high bit rate 2 (HBR2), or high bit rate 3 (HBR3). It should be noted that, in prior art, the transmission bandwidth between the scaling controller 21 and the timing controller 22 is not changed with display pixel rate or pixel clock, and the transmission bandwidth thereof is fixed transmission rate. The scaling controller 21 may pre-configure the transmission bandwidth of the transmission protocol according to the specification of the timing controller 22. Generally speaking, the scaling controller 21 may select a sufficiently large bandwidth and transmission channel to transmit the video stream. However, higher transmission bandwidth means higher power consumption. Moreover, the video stream is transmitted in the form of micro-packets. When a video with a lower update rate is in transmitted, a large amount of empty packet data is generated, and excessively high invalid empty packet data may also cause waste of transmission resources. Therefore, there is a need to dynamically reduce the transmission bandwidth between the scaling controller 21 and the timing controller 22 for situations with lower transmission bandwidth requirements. Or, there is a need to dynamically increase the transmission bandwidth between the scaling controller 21 and the timing controller 22 for situations with higher transmission bandwidth requirements.

Figure 3:
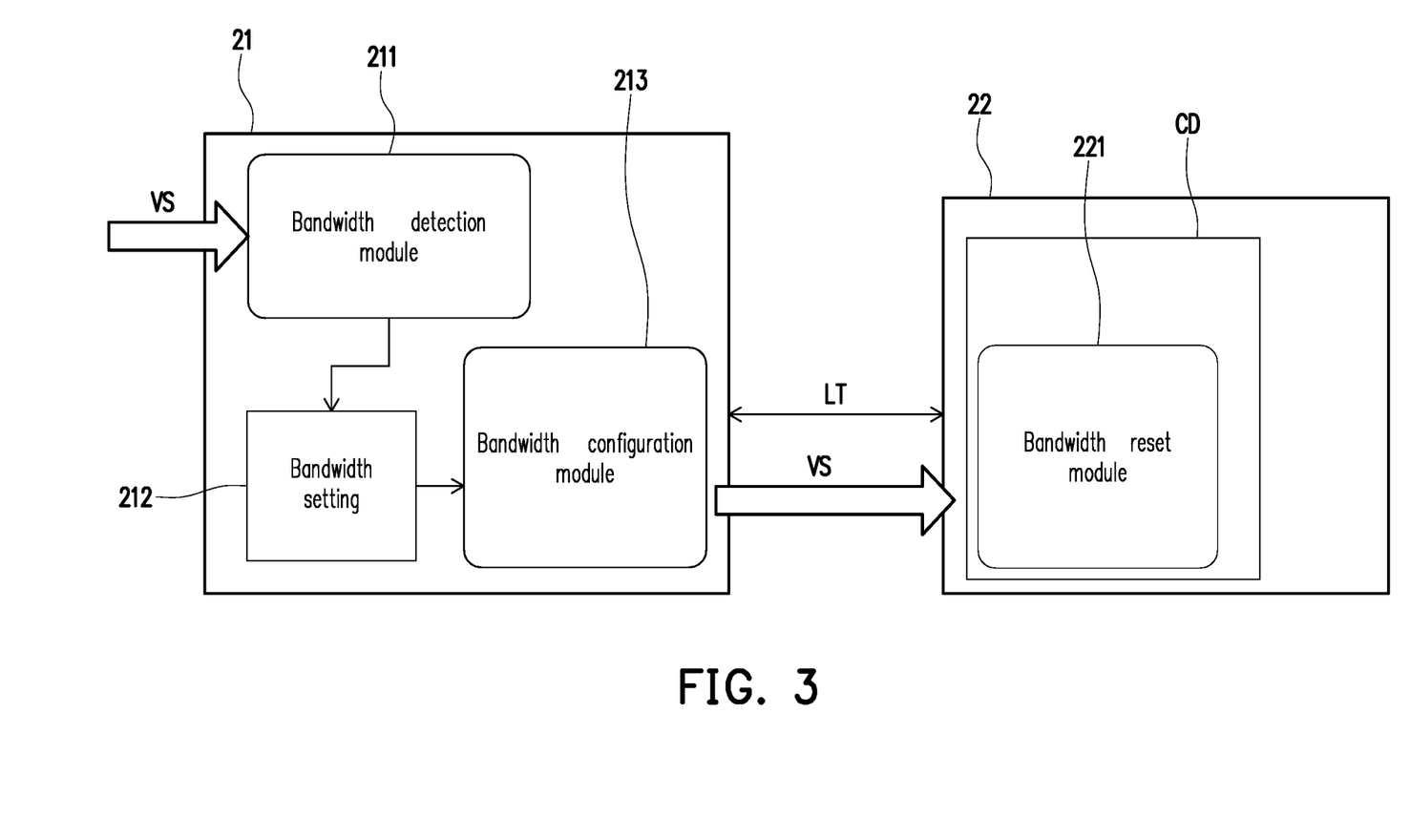
FIG. 3 is a block diagram of elements of a functional module according to an embodiment of the invention.

FIG. 3 is a block diagram of elements of a functional module according to an embodiment of the invention. Referring to FIG. 3, the scaling controller 21 includes a bandwidth detection module 211 and a bandwidth configuration module 213. The bandwidth detection module 211 of the scaling controller 21 may detect the first bandwidth BW1 of a video stream VS outputted by the source system 10.

In an embodiment, the bandwidth detection module 211 may determine whether a flag is related to no video stream. The DP (DisplayPort) protocol is taken as an example (but not limited to DP, and may also be, for example, HDMI, Type-C, or other communication protocols between the source system and the display). DP belongs to the new video transmission interface in the computer industry. It is an external communication interface and needs a standardized connector connection. Various different equipment and devices may be connected via a standard DP cable. For example, a desktop computer and a notebook computer may be connected with an external extended screen. As another example, an equipment with a DP host, for example, needs to be connected to the display for display using a standard DP cable. In addition to the DP interface, the external communication interface also includes HDMI and Type-C interfaces. Taking FIG. 1 as an example, the source system 10 and the display 20 use an external communication interface, such as a DP interface and a DP standard cable. The first bandwidth BW1 of the video stream is transmitted based on the external communication interface.

Moreover, eDP (Embedded DisplayPort) is a closed communication interface, but there is no standardized connector. Therefore, there is a need for connectors tailored for a variety of different system combinations. The connecting device is controlled by the original equipment manufacturer (OEM) of the system, and is directly connected to the timing controller of the display panel and packaged inside the device. Examples include a display, a notebook computer, or a tablet computer. The current mainstream of the closed communication interface is eDP. Taking FIG. 1 as an example, the communication between the scaling controller 21 and the timing controller 22 adopts a closed communication interface. A second bandwidth BW2 is transmitted based on the encapsulated communication interface.

The connection methods of eDP and DP physical interfaces are different. Taking DP as an example to illustrate the communication interface of the source system 10 is only one of the external interfaces, and is not limited to DP. Different external interfaces have no effect on the technique of this specification, the pixel clock recorded in the attribute data of the video stream VS of the source system 10 may meet the application of this technique, and the scaling controller 21 may always detect the pixel clock of the video stream VS of the source system 10 based on different external communications.

A VB-ID (vertical blanking ID) bit used to indicate the transmission status of the video stream VS is transmitted on the main link. If "NoVideoStream_Flag" in VB-ID is "1", the previous BS (blanking start) is inserted but a video stream is not transmitted (i.e., associated with no video stream). Moreover, if "VerticalBlanking_Flag" in the VB-ID bit is "1", the end of the final active line of the video frame is reached and this setting is maintained throughout the vertical blanking period, or a video stream is not transmitted (i.e., associated with no video stream). Therefore, if the bandwidth detection module 211 detects that "NoVideoStream_Flag" and/or "VerticalBlanking_Flag" is changed from "0" to "1", timing, update rate, or bandwidth rate is changed, which may also mean that the first bandwidth BW1 is changed.

In an embodiment, the bandwidth detection module 211 may receive attribute data of the video stream VS. The attribute data includes the pixel clock corresponding to the first bandwidth BW1 of the video stream VS from the source system 10. Taking DP as an example, the attribute data is MSA (main stream attribute). During the vertical blanking period of the video stream VS, MSA data is transmitted on the main link every other frame. The MSA data field includes symbols "Mvid" and "Nvid". The symbols "Mvid" and "Nvid" are used to indicate the pixel clock of the video stream VS. The pixel clock indicates the timing of the video stream VS data size per frame from the source system 10. Therefore, if the bandwidth detection module 211 detects that the pixel clock recorded in the attribute data is different from the previous or new pixel clock, the timing, update rate, or bandwidth rate is changed, which may also mean that the first bandwidth BW1 is changed.

For example, if the resolution of the video stream is 4K 24 bpp (bits per pixel) and the FPS (frames per second) is 30 Hertz (Hz) (that is, the pixel clock is 297 MHz), the bandwidth rate of the first bandwidth BW1 is 8.8 Gbit/s. If the resolution of the video stream is 4K 24 bpp and the FPS is 60 Hz (that is, the pixel clock is 594 MHZ), the bandwidth rate of the first bandwidth BW1 is 17.5 Gbit/s. If the resolution of the video stream is 4K 24 bpp and the FPS is 144 Hz (that is, the pixel clock is 1332.75 MHz), the bandwidth rate of the first bandwidth BW1 is 40 Gbit/s. If the resolution of the video stream is 4K 24 bpp and the FPS is much lower than 10 Hz (that is, the picture is almost still), the bandwidth rate of the first bandwidth BW1 is 3 Gbit/s.

Referring to FIG. 2, the scaling controller 21 compares the first bandwidth BW1 with the second bandwidth BW2 to obtain a comparison result of the first bandwidth BW1 and the second bandwidth BW2 (step S220). Specifically, the second bandwidth BW2 is the bandwidth or transmission rate used for communication between the scaling controller 21 and the timing controller 22. Taking the eDP protocol as an example, the second bandwidth BW2 may be HBR, HBR2, or HBR3, and the bandwidth rates thereof are 10.8, 21.6, and 54 Gbit/s respectively. If the first bandwidth BW1 is much less than the second bandwidth BW2 (for example, the difference exceeds 5 Gbit/s or 10 Gbit/s), waste of bandwidth may occur, thereby increasing power consumption.

In an embodiment, please refer to FIG. 3, the bandwidth detection module 211 may according to the first bandwidth BW1 of the video stream VS is the bandwidth outputted by the source system 10. The second bandwidth BW2 selects one selected bandwidth from a plurality of reference bandwidths. The first bandwidth BW1 of the video stream VS is the bandwidth inputted into the display 20 by the source system 10. This bandwidth is not a specific reference bandwidth, but is based on the actual output video resolution of the source system 10 or the bandwidth size of the update rate. For example, if the source system 10 transmits a 4K 24 bpp video stream VS with an FPS of 30 Hz, and the pixel clock thereof is 297 MHz, the first bandwidth BW1 is equal to 297 MHz; if the source system 10 transmits a 4K 24 bpp video stream VS with an FPS of 60 Hz, and the pixel clock thereof is 594 MHZ, the first bandwidth BW1 is equal to 594 MHz. That is, the first bandwidth BW1 is the timing size of the source system 10 set by the user. Moreover, for the second bandwidth BW2 used by the scaling controller 21 and the timing controller 22, this bandwidth is a selected one of specific reference bandwidths, such as one of RBR, HBR, HBR2, or HBR3, and the changed third bandwidth (to be described in detail later) is also the same. For example, the third bandwidth is a bandwidth more suitable for the current video stream VS selected from the specific reference bandwidths according to the quotient of the first bandwidth BW1 and the second bandwidth BW2 to replace the previously used second bandwidth BW2. It may be seen from this that the first bandwidth BW1 is the actual bandwidth of the source system 10, and the size thereof depends on actual usage. Both the second bandwidth BW2 and the third bandwidth are one of the specific reference bandwidths, and the size thereof is the size of the selected reference bandwidth.

In an embodiment, the reference bandwidth is a plurality of link rates supported by the eDP standard for the main link, such as HBR, HBR2, or HBR3, and the main link is used to transmit the video stream VS. The selected bandwidth should be greater than the first bandwidth BW1 to avoid affecting video quality. However, if the selected bandwidth is much greater than the first bandwidth BW1 (for example, the difference exceeds 5 Gbit/s or 10 Gbit/s), bandwidth waste may occur. Therefore, the reference bandwidth closest to and greater than the first bandwidth BW1 may be used as the selected bandwidth. That is, the most suitable bandwidth specification that complies with the agreed standard is met.

The bandwidth detection module 211 may compare whether the selected bandwidth is the same as the second bandwidth BW2. The comparison result includes the selected bandwidth being the same as the second bandwidth BW2 and the selected bandwidth being different from the second bandwidth BW2. For example, if the selected bandwidth is HBR, but the second bandwidth BW2 is HBR2, the selected bandwidth is different from the second bandwidth BW2.

Referring to FIG. 3, the bandwidth detection module 211 records the detected first bandwidth BW1 or the selected bandwidth in a bandwidth setting 212, and outputs the bandwidth setting 212 to the bandwidth configuration module 213. In an embodiment, in response to the change of the flag associated with no video stream and the pixel clock recorded in the attribute data, or the change of the first bandwidth BW1, the bandwidth configuration module 213 may notify the timing controller 22 about the change of the first bandwidth BW1.

In an embodiment, please refer to FIG. 3, the bandwidth configuration module 213 writes configuration data CD to the timing controller 22 based on the bandwidth setting 212. The configuration data CD includes the selected bandwidth. Taking eDP as an example, the configuration data CD is DPCD (DisplayPort configuration data). A DPCD register is used to announce the capabilities and status of a receiver (i.e., the timing controller 22). The bandwidth configuration module 213 may write the selected bandwidth into the DPCD register of the timing controller 22. A bandwidth reset module 221 of the timing controller 22 may read the selected bandwidth stored in the register to obtain a reference bandwidth suitable for the current video stream VS.

Referring to FIG. 2, the timing controller 22 changes the second bandwidth BW2 to a third bandwidth according to the comparison result (step S230). Specifically, if the second bandwidth BW2 is not suitable for the first bandwidth needed by the current video stream, the second bandwidth BW2 may be changed. The third bandwidth is different from the second bandwidth BW2. In an embodiment, the third bandwidth is a bandwidth determined based on the selected bandwidth. For example, the third bandwidth is the above selected bandwidth. That is, the reference bandwidth closest to and greater than the first bandwidth BW1.

In an embodiment, in response to the selected bandwidth being the same as the second bandwidth BW2, the timing controller 22 may maintain the second bandwidth BW2. That is, the second bandwidth BW2 disabled/not changed. Moreover, in response to the selected bandwidth being different from the second bandwidth BW2, the timing controller 22 may change the second bandwidth BW2 to the selected/third bandwidth.

Taking FIG. 3 as an example, if the first bandwidth BW1 is 8.8 Gbit/s, the bandwidth reset module 221 switches the second bandwidth BW2 to HBR (the bandwidth rate thereof is 10.8 Gbit/s). If the first bandwidth BW1 is 17.5 Gbit/s, the bandwidth reset module 221 switches the second bandwidth BW2 to HBR2 (the bandwidth rate thereof is 21.6 Gbit/s). If the first bandwidth BW1 is 40 Gbit/s, the bandwidth reset module 221 switches the second bandwidth BW2 to HBR3 (the bandwidth rate thereof is 54 Gbit/s). If the first bandwidth BW1 is 3 Gbit/s, the bandwidth reset module 221 switches the second bandwidth BW2 to HBR.

In an embodiment, please refer to FIG. 3, the timing controller 22 may start a link training LT with the scaling controller 21 according to the third bandwidth. The link training is the link initialization before the video stream is transmitted and is used to train the link between the scaling controller 21 and the timing controller 22. For example, link parameters are set based on the third bandwidth. The third bandwidth is used for the transmission of the video stream on the link. In response to the completion of the link training based on the third bandwidth, the scaling controller 21 may transmit the video stream VS to the timing controller 22 to output the video stream VS to the display panel 23.

Figure 4:
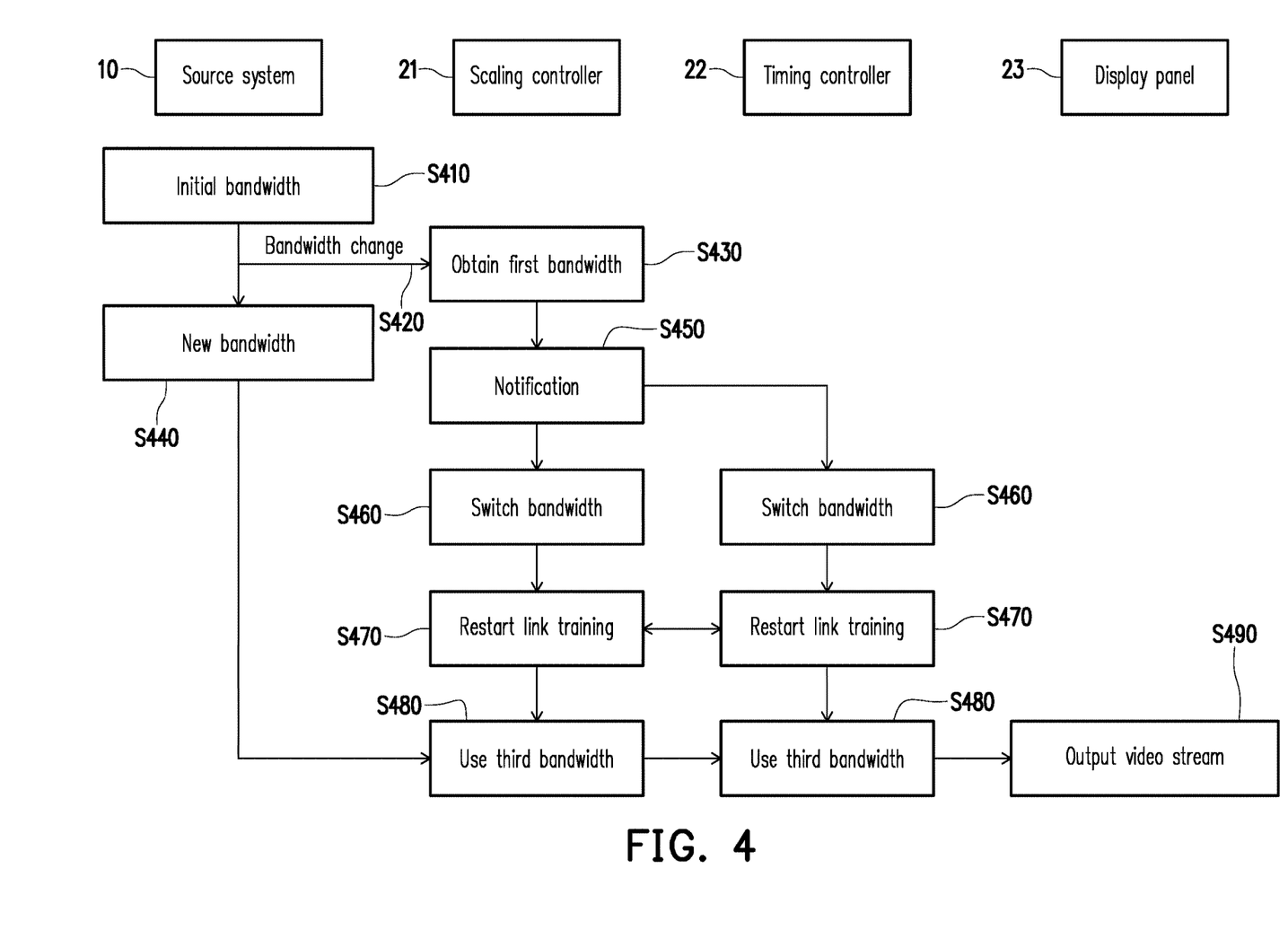
FIG. 4 is an overall flowchart of bandwidth switching according to an embodiment of the invention.

FIG. 4 is an overall flowchart of bandwidth switching according to an embodiment of the invention. Referring to FIG. 4, the video stream outputted by the source system 10 needs an initial bandwidth (corresponding to an initial update rate) (step S410). In response to the bandwidth/update rate change of the video stream (step S420), the scaling controller 21 obtains the current first bandwidth BW1 of the video stream (step S430), and the video stream needs a new bandwidth (corresponding to a new update rate) (step S440). In response to the scaling controller 21 detecting that the reference bandwidth corresponding to the first bandwidth BW1 is different from the second bandwidth BW2, the scaling controller 21 notifies the change (for example, increase or decrease) of the first bandwidth BW1 (step S450).

The scaling controller 21 and the timing controller 22 switch the second bandwidth BW2 to a third bandwidth (step S460). The scaling controller 21 and the timing controller 22 restart the link training according to the third bandwidth (step S470). The scaling controller 21 uses the third bandwidth to transmit the video stream to the timing controller 22 (step S480). Next, the timing controller 22 outputs the video stream to the display panel 23 (step S490).

Figure 5:
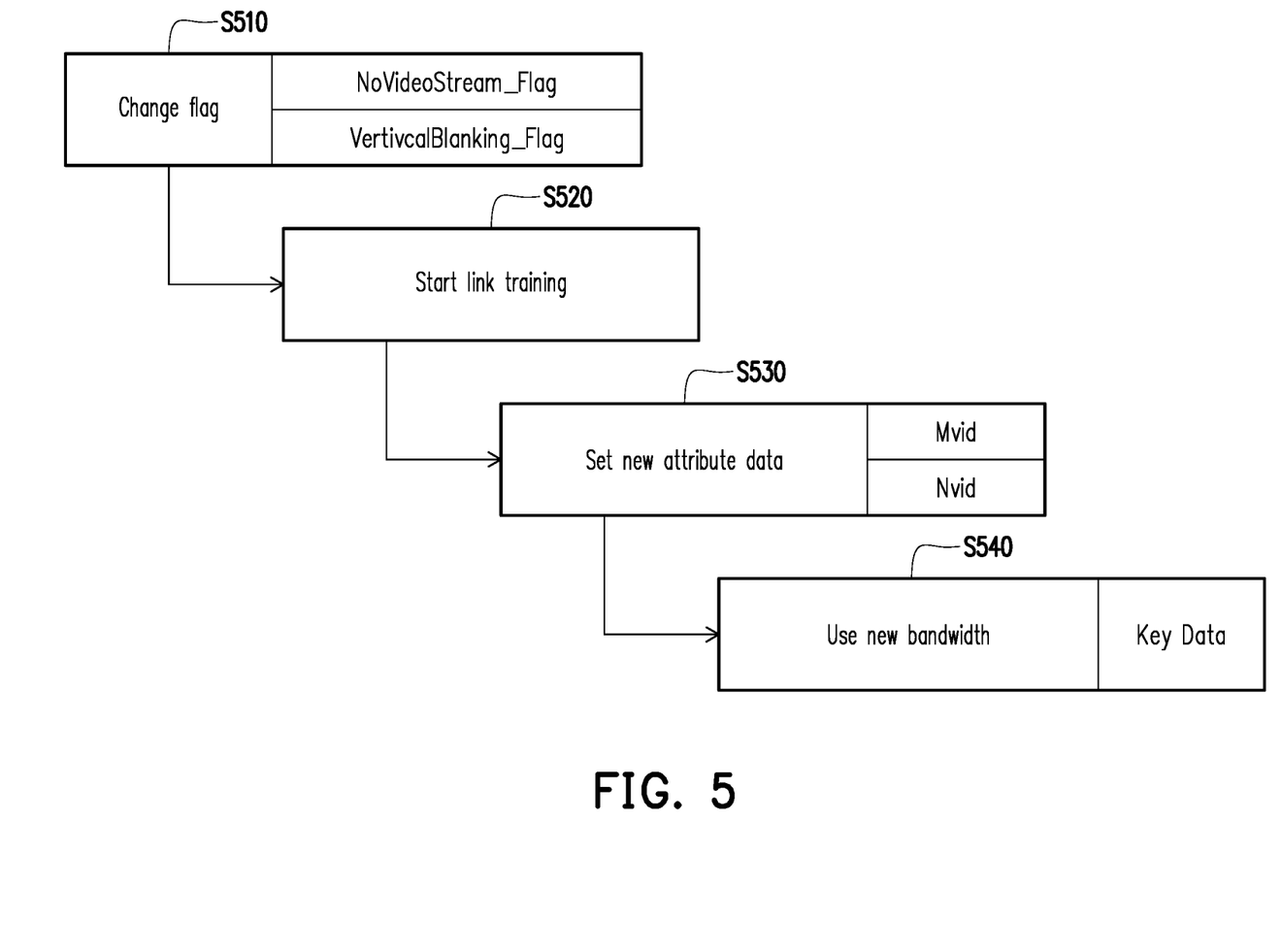
FIG. 5 is a flowchart of controlling data transmission according to an embodiment of the invention.

FIG. 5 is a flowchart of controlling data transmission according to an embodiment of the invention. Referring to FIG. 5, the source system 10 changes a flag (step S510). For example, the "NoVideoStream_Flag" and/or "Vertical-Blanking_Flag" bits in the VB-ID are set to "1". The source system 10 and the scaling controller 21 start to perform a link training (step S520). The source system 10 sets a new timing/pixel clock of the new MSA data during the blank period (step S530). For example, Table (1) is the parameters of the MSA data:

TABLE 1

| HTotal [15:0] | HStart [15:0] | HSyncPolarity [0] | HSyncWidth [14:0] | Mvid |
|---|---|---|---|---|
| VTotal [15:0] | VStart [15:0] | VSyncPolarity [0] | VSyncWidth [14:0] | Nvid |

HTotal is the horizontal total of the video stream, and VTotal is the vertical total of the video stream. HStart is the horizontal active start of the video stream, and VStart is the vertical active start of the video stream. HSyncPolarity is the horizontal sync polarity of the video stream, and VSyncPolarity is the vertical sync polarity of the video stream. HSync Width is the horizontal sync width of the video stream, and VSyncWidth is the vertical sync width of the video stream. And as explained above, Mvid and Nvid may be used to indicate the new timing/pixel clock. Then, the source system 10 transmits the video stream (for example, key data) with the new bandwidth (corresponding to the new timing/pixel clock).

Figure 6:
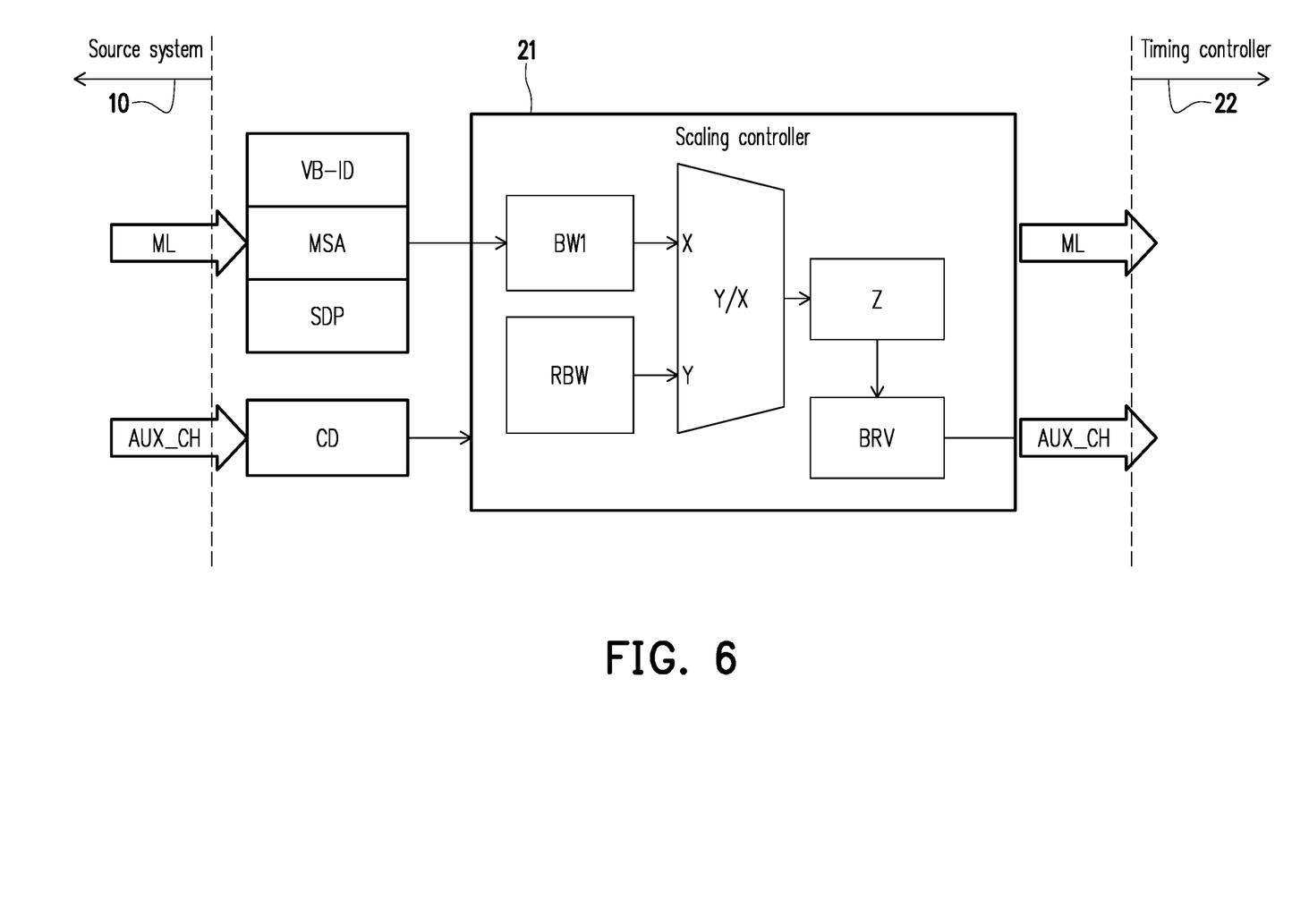
FIG. 6 is a functional diagram of a scaling controller according to an embodiment of the invention.

FIG. 6 is a functional diagram of a scaling controller 21 according to an embodiment of the invention. Referring to FIG. 6, the source system 10 transmits VB-ID, MSA data, and secondary data packets (SDP) on a main link ML, and transmits the configuration data CD (e.g., DPCD) on an auxiliary channel AUX_CH.

In an embodiment, the scaling controller 21 may determine quotients of a plurality of reference bandwidths RBW and the first bandwidth BW1 respectively. For example, the scaling controller 21 obtains the current pixel clock of the video stream from symbols "Mvid" and "Nvid" in the MSA data of the source system 10. Table (2) is the reference bandwidths:

TABLE 2

| Reference bandwidth | Bandwidth rate (pixel clock) |
|---|---|
| HBR | 368.64 MHz |
| HBR2 | 737.28 MHz |
| HBR3(8.1G) | 1105.92 MHZ |

The scaling controller 21 may calculate the ratio:

$$Z[1:0] = \text{Round}(Y/X) \quad (1)$$

Z is the quotient (Z={0b00 0b01 0b10 0b11}), Y is the reference bandwidth, X is the first bandwidth BW1, and Round ( ) is a rounding function.

It is assumed that Table (3) is the mapping relationship of the calculation results of Z.

TABLE 3

| 0b00 | 0b01 | 0b10 | 0b11 |
|---|---|---|---|
| Excluded | Preferred selection | Preferred selection without "0b01" | Preferred selection without "0b01" and "0b11" |

Since "0b00" is less than 1, "0b00" is excluded, and "0b01" is the preferred selection for the selected bandwidth. The secondary selections are "0b10" and "0b11" in that order.

The scaling controller 21 may determine a selected bandwidth BRV according to a quotient Z. For example, Table (4) shows the data mapping relationship of the reference bandwidths RBW:

TABLE 4

| RBW1: HBR | RBW2: HBR2 | RBW3: HBR3(8.1G) |
|---|---|---|
| 0 × 0A | 0 × 14 | 0 × 81 |

Taking 4K 24 bpp and FPS at 30 Hz as an example, the pixel clock thereof is 297 MHz. HBR/297 MHz=1.23, Z=Round (HBR/297 MHz)=0b01; HBR2/297 MHz=2.48, Z=Round (HBR2/297 MHz)=0b10; HBR3/297 MHz=3.72, Z=Round (HBR3/297 MHz)=0b11. Therefore, the selected bandwidth BRV is 0x0A. That is, HBR.

Taking 4K 24 bpp and FPS at 60 Hz as an example, the pixel clock thereof is 594 MHz. HBR/594 MHz=0.62, Z=Round (HBR/594 MHz)=0b00; HBR2/594 MHz=1.24, Z=Round (HBR2/594 MHz)=0b01; HBR3/594 MHz=1.86, Z=Round (HBR3/594 MHz)=0b01. Therefore, the selected bandwidth BRV is 0x14, wherein 1.24 is the closest to 1. That is, HBR2.

In an embodiment, in response to receiving the notification about the change of the first bandwidth BW1, the timing controller 22 may transmit the second configuration data (for example, DPCD capability) to the scaling controller 21, and the second configuration data includes the second bandwidth BW2.

In an embodiment, the scaling controller 21 may compare the second bandwidth BW2 with the selected bandwidth BRV. In response to the fact that the second bandwidth BW2 is equal to the selected bandwidth BRV, the scaling controller 21 maintains the original bandwidth rate. Moreover, in response to the fact that the second bandwidth BW2 is not equal to the selected bandwidth BRV, the scaling controller 21 changes the original bandwidth rate. In addition, the scaling controller 21 may write the configuration data recorded with the selected bandwidth BRV in the DPCD register used for storing the configuration data of the timing controller 22.

Figure 7:
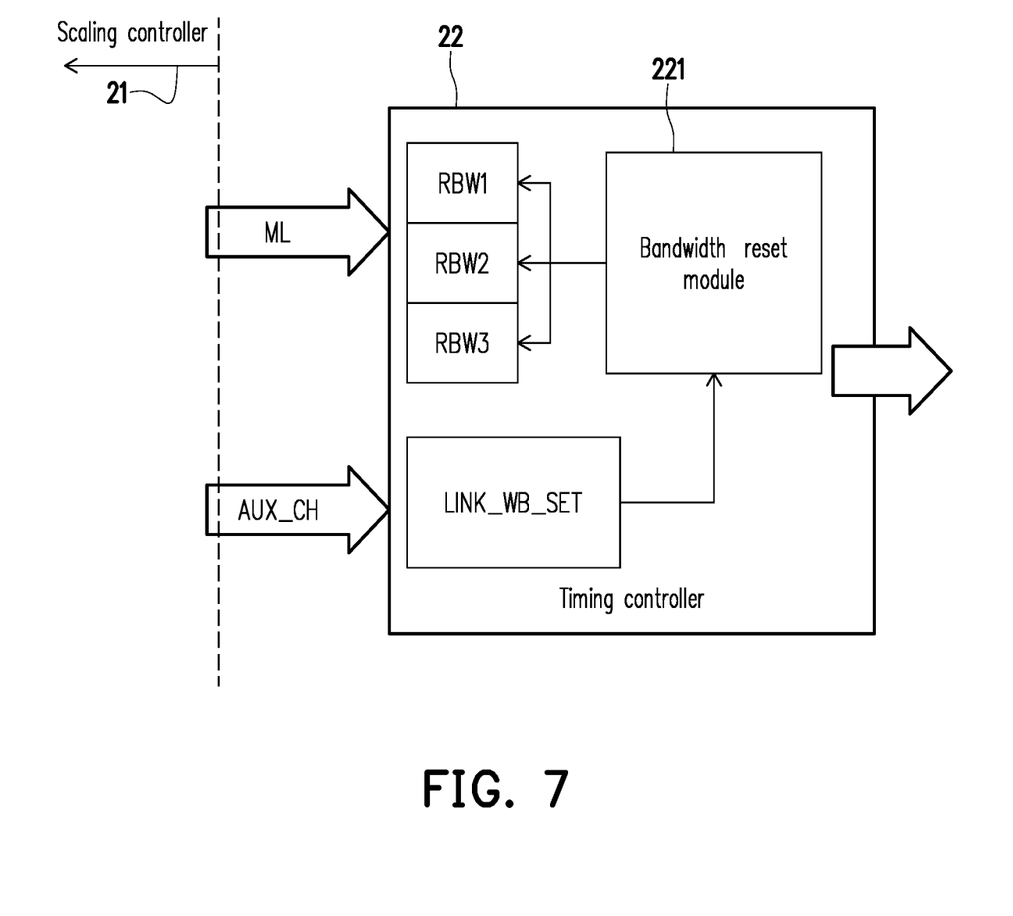
FIG. 7 is a functional diagram of a timing controller according to an embodiment of the invention.

FIG. 7 is a functional diagram of the timing controller 22 according to an embodiment of the invention. Referring to FIG. 7, the scaling controller 21 may transmit bandwidth setting LINK_WB_SET data on the auxiliary channel AUX_CH. The bandwidth setting LINK_WB_SET data is used to indicate the third bandwidth. That is, the selected bandwidth is recorded. For example, 06 h is 1.62 Gbps/lane (corresponding to reduced bit rate (RBR)), 0 Ah is 2.7 Gbps/lane (corresponding to HBR), 14 h is 5.4 Gbps/lane (corresponding to HBR2), and 81 h is 8.1 Gbps/lane (corresponding to HBR3). The bandwidth reset module 221 may determine whether to switch/change the second bandwidth BW2 of the main link according to the bandwidth setting LINK_WB_SET data. The bandwidth reset module 221 may compare the bandwidth setting LINK_WB_SET data with the raw data of the register (for example, the second bandwidth BW2 is recorded). In response to the bandwidth setting LINK_WB_SET data having the same value as the raw data, the bandwidth reset module 221 may maintain the original bandwidth rate. Moreover, in response to the fact that the bandwidth setting LINK_WB_SET data has a different value from the raw data, the bandwidth reset module 221 may change the bandwidth rate of the second bandwidth BW2. For example, the second bandwidth BW2 is changed to the third bandwidth. In addition, the timing controller 22 may start link training with the scaling controller 21 according to the third bandwidth.

For example, the raw data of the register is 0x0A (i.e., HBR). If the bandwidth setting LINK_WB_SET data written by the scaling controller 21 is 0x14 (that is, different from the raw data), the timing controller 22 resets the configuration data of the transmission interface, and switches to the third bandwidth (the bandwidth rate thereof is HBR2). In addition, the scaling controller 21 also sets the bandwidth rate of the main link to HBR2, and then starts link training.

Figure 8:
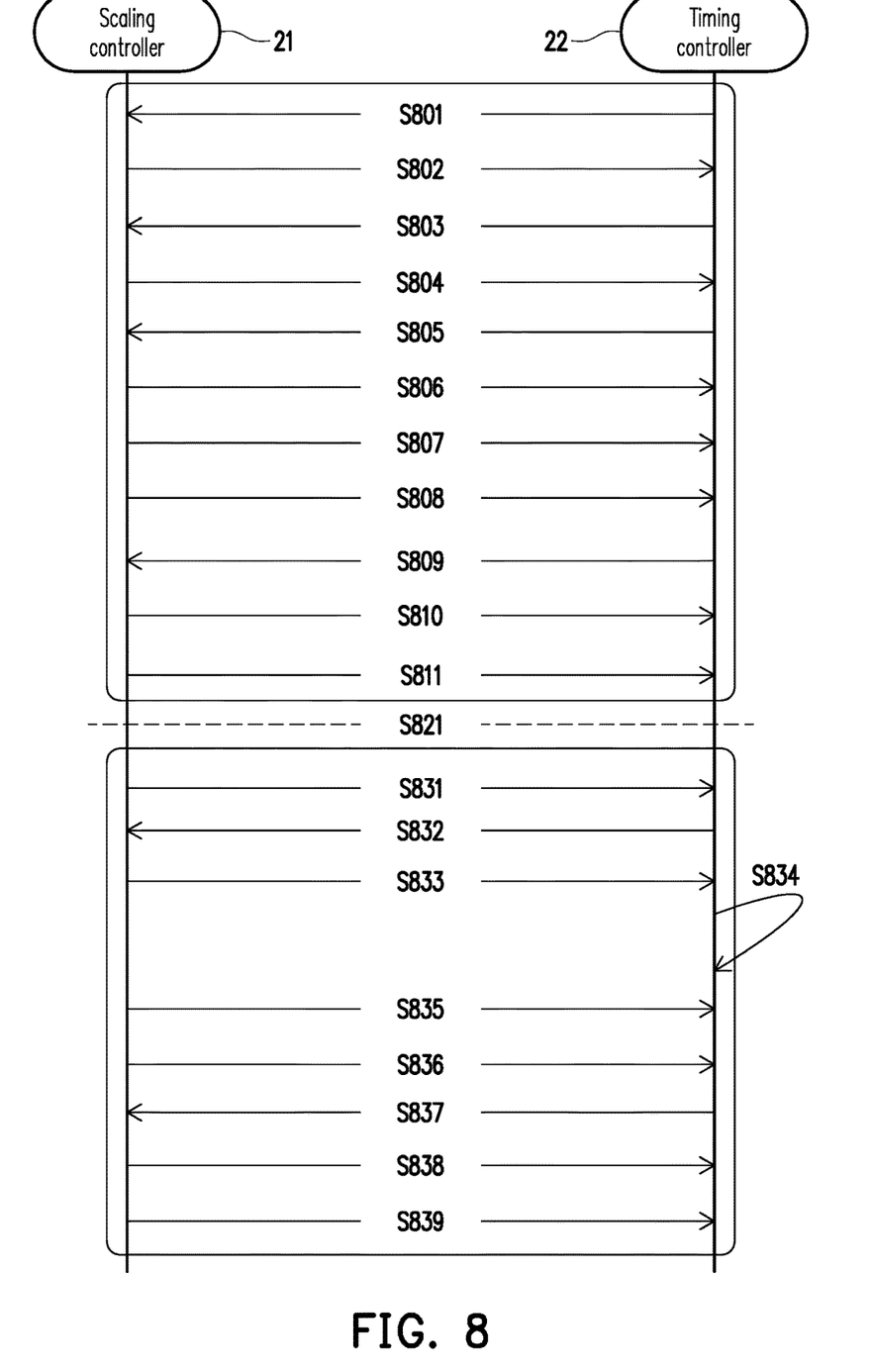
FIG. 8 is a flowchart of identification and control according to an embodiment of the invention.

FIG. 8 is a flowchart of identification and control according to an embodiment of the invention. Referring to FIG. 8, taking the link training procedure of eDP as an example, the timing controller 22 generates a hot plug detection pulse (step S801). The scaling controller 21 reads the capabilities of the timing controller 22 (step S802), and the timing controller 22 transmits the capabilities thereof to the scaling controller 21 (step S803). The scaling controller 21 reads extended display identification data (EDID) (step S804), and the timing controller 22 transmits the EDID to the scaling controller 21 (step S805). The scaling controller 21 writes the link configuration (step S806), so that the timing controller 22 starts eDP authentication. The scaling controller 21 starts link training (step S807). The scaling controller 21 reads the status of the link and the timing controller 22 (step S808), and the timing controller 22 transmits the status thereof to the scaling controller 21 (step S809). The scaling controller 21 transmits the MSA data (step S810). Next, the scaling controller 21 transmits the video stream to the timing controller 22 (step S811).

In response to the bandwidth change of the video stream of the source system 10 (step S821), the scaling controller 21 transmits a flag associated with no video stream (step S831). The timing controller 22 transmits the capabilities thereof to the scaling controller 21 (step S832) to inform the second bandwidth BW2. The scaling controller 21 writes the selected/third bandwidth to the register of the timing controller 22 (step S833). The timing controller 22 switches/changes the second bandwidth BW2 according to the selected/third bandwidth (step S834). Next, the scaling controller 21 starts link training (step S835). The scaling controller 21 reads the status of the link and the timing controller 22 (step S836), and the timing controller 22 transmits the status thereof to the scaling controller 21 (step S837). The scaling controller 21 transmits the MSA data (step S838). Next, the scaling controller 21 transmits the video stream to the timing controller 22 (step S839).

Figure 9:
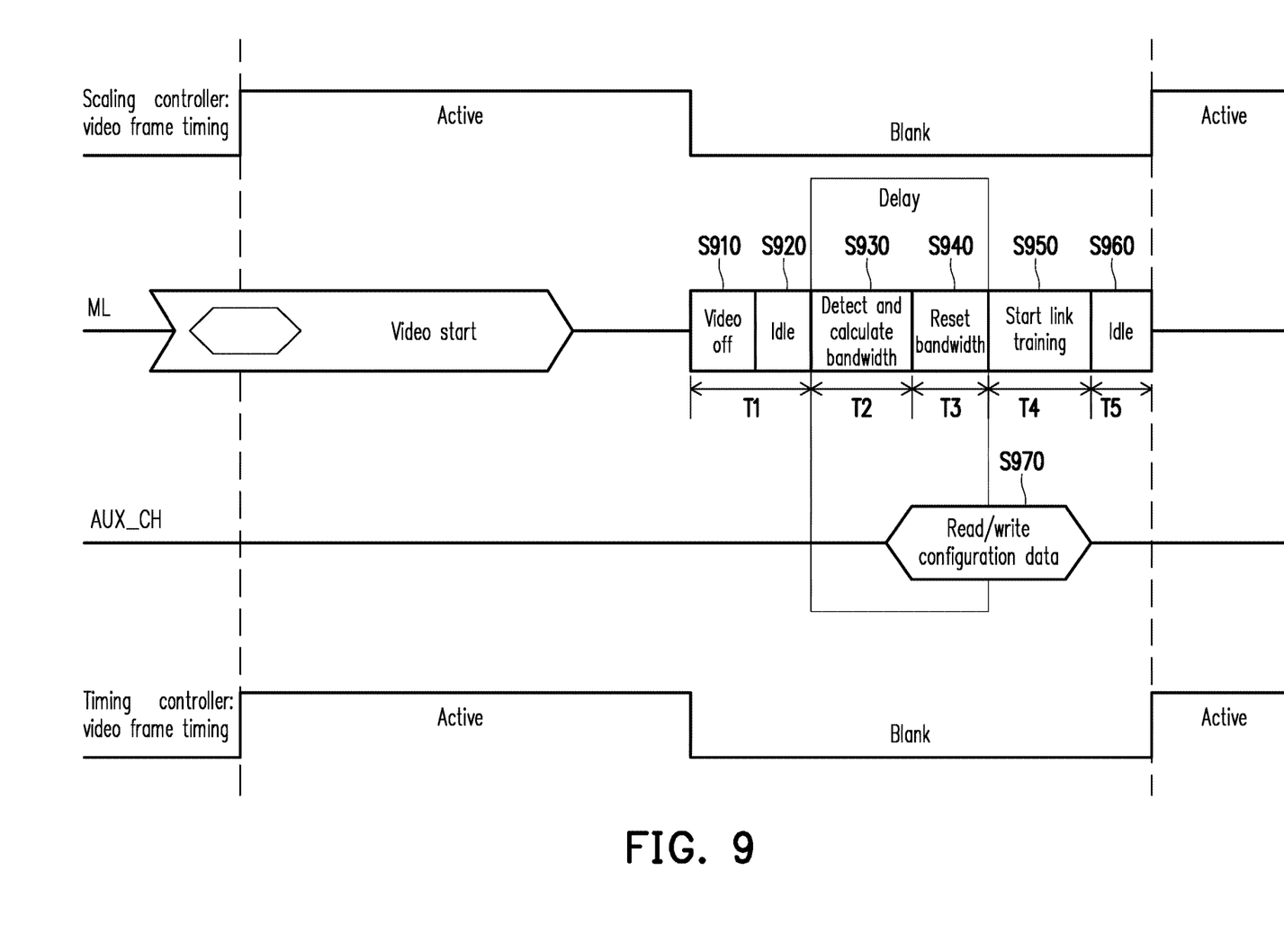
FIG. 9 is a timing diagram of bandwidth switching according to an embodiment of the invention.

FIG. 9 is a timing diagram of bandwidth switching according to an embodiment of the invention. Please refer to FIG. 9, during the process of transmitting the video stream on the main link ML, the video frame timing of the scaling controller 21 and the timing controller 22 is active. In response to a change in the bandwidth/timing/update rate of the video stream, the source system 10 may transmit an idle pattern to output a blank pattern to the display panel 23 until the scaling controller 21 and the timing controller 22 set a new bandwidth during the vertical blank period. In addition, during the vertical blank period, the VB-ID and MSA are sequentially transmitted on the main link ML (step S910, and the video stream is stopped outputting). Next, the idle pattern is transmitted (step S920). The scaling controller 21 detects the first bandwidth and calculates the third bandwidth (step S930). The timing controller 22 resets the second bandwidth according to the third bandwidth (step S940). The scaling controller 21 starts link training (step S950). Next, the idle pattern is transmitted (step S960). Moreover, configuration data is read and written via the auxiliary channel AUX_CH (step S970). For example, the second bandwidth is read and the third bandwidth is written.

Time T1 is about 100 milliseconds (ms), time T2 is about 200 ms, time T3 is about 200 ms, and time T4 is determined according to the link training protocol. The minimum value of time T5 is based on the requirements of the start-of-blank (BS) symbol and the subsequent blank pattern thereof and the maximum value thereof allows frame synchronization. Therefore, the time when the screen is blank does not significantly affect viewing experience.

It should be noted that the above application scenarios and examples take eDP as an example, but may be applied to other transmission protocols based on the spirit of the invention.

Based on the above, in the video transmission method and the display of the embodiments of the invention, the transmission bandwidth between the scaling controller and the timing controller may be changed in response to the change of the desired bandwidth of the video stream. Under the premise of ensuring that the video quality is not affected, the transmission of redundant empty packet data is reduced, thereby saving transmission resources and reducing power consumption.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A video transmission method, adapted for a display, wherein the display comprises a timing controller and a scaling controller, the video transmission method comprising:
   detecting a first bandwidth of a video stream inputted into the display by the scaling controller;
   comparing the first bandwidth with a second bandwidth used by the timing controller and the scaling controller to obtain a comparison result of the first bandwidth and the second bandwidth; and
   changing the second bandwidth to a third bandwidth by the timing controller according to the comparison result, wherein the third bandwidth is used for a transmission of the video stream.

2. The video transmission method of claim 1, wherein the step of comparing the first bandwidth with the second bandwidth comprises:
   selecting a selected bandwidth from a plurality of reference bandwidths according to the first bandwidth, wherein the selected bandwidth is a bandwidth closest to and greater than the first bandwidth in the reference bandwidths, the third bandwidth is the selected bandwidth, and the second bandwidth is one of the reference bandwidths; and
   comparing whether the selected bandwidth is the same as the second bandwidth, wherein the comparison result comprises the selected bandwidth being the same as the second bandwidth and the selected bandwidth being different from the second bandwidth.

3. The video transmission method of claim 2, wherein the step of selecting the selected bandwidth comprises:
   determining respective quotients of the reference bandwidths and the first bandwidth; and
   selecting one of the reference bandwidths having a quotient greater than one and closest to one as the selected bandwidth.

4. The video transmission method of claim 2, wherein the step of changing the second bandwidth to the third bandwidth comprises:
   maintaining the second bandwidth in response to the selected bandwidth being the same as the second bandwidth; and
   changing the second bandwidth to the third bandwidth in response to the selected bandwidth being different from the second bandwidth.

5. The video transmission method of claim 2, wherein the step of comparing the first bandwidth with the second bandwidth comprises:
   writing configuration data to the timing controller via the scaling controller, wherein the configuration data comprises the selected bandwidth.

6. The video transmission method of claim 2, wherein the reference bandwidths are a plurality of link rates supported by an Embedded DisplayPort (eDP) standard for a main link, and the main link is used to transmit the video stream.

7. The video transmission method of claim 1, wherein the step of detecting the first bandwidth of the video stream inputted into the display comprises:
   determining whether a flag is associated with a no video stream; and
   notifying the timing controller of a change in the first bandwidth in response to the flag being associated with the no video stream.

8. The video transmission method of claim 1, wherein the step of detecting the first bandwidth of the video stream inputted into the display comprises:
   receiving attribute data of the video stream, wherein the attribute data comprises a pixel clock corresponding to the first bandwidth.

9. The video transmission method of claim 1, wherein the step of changing the second bandwidth of the timing controller to the third bandwidth comprises:
   starting a link training between a scaling controller and the timing controller according to the third bandwidth, wherein the display further comprises the scaling controller; and
   outputting the video stream in response to a completion of the link training.

10. The video transmission method of claim 1, wherein the step of changing the second bandwidth to the third bandwidth comprises:
    stopping outputting the video stream.

11. A display, comprising:
    a timing controller; and
    a scaling controller coupled to the timing controller and used to detect a first bandwidth of a video stream inputted into the display and compare the first bandwidth with a second bandwidth used by the timing controller and the scaling controller to obtain a comparison result of the first bandwidth and the second bandwidth,
    wherein the timing controller is used to change the second bandwidth to a third bandwidth according to the comparison result, and the third bandwidth is used for a transmission of the video stream.

12. The display of claim 11, wherein the scaling controller further performs:
    selecting a selected bandwidth from a plurality of reference bandwidths according to the first bandwidth, wherein the selected bandwidth is a bandwidth closest to and greater than the first bandwidth in the reference bandwidths, the third bandwidth is the selected bandwidth, and the second bandwidth is one of the reference bandwidths; and
    comparing whether the selected bandwidth is the same as the second bandwidth, wherein the comparison result comprises the selected bandwidth being the same as the second bandwidth and the selected bandwidth being different from the second bandwidth.

13. The display of claim 12, wherein the scaling controller further performs:
    determining respective quotients of the reference bandwidths and the first bandwidth; and
    selecting one of the reference bandwidths having a quotient greater than one and closest to one as the selected bandwidth.

14. The display of claim 12, wherein the timing controller further performs:
    maintaining the second bandwidth in response to the selected bandwidth being the same as the second bandwidth; and
    changing the second bandwidth to the third bandwidth in response to the selected bandwidth being different from the second bandwidth.

15. The display of claim 12, wherein the scaling controller further performs:
    transmitting configuration data to the timing controller, wherein the configuration data comprises the selected bandwidth.

16. The display of claim 12, wherein the reference bandwidths are a plurality of link rates supported by an eDP standard for a main link, and the main link is used to transmit the video stream.

17. The display of claim 11, wherein the scaling controller further performs:
  determining whether a flag is associated with a no video stream; and
  notifying the timing controller of a change in the first bandwidth in response to the flag being associated with the no video stream.

18. The display of claim 11, wherein the scaling controller further performs:
  receiving attribute data of the video stream, wherein the attribute data comprises a pixel clock corresponding to the first bandwidth.

19. The display of claim 11, wherein the timing controller further performs:
  starting a link training with the scaling controller according to the third bandwidth; and
  outputting the video stream in response to a completion of the link training.

20. The display of claim 11, wherein the scaling controller further performs:
  stopping outputting the video stream.

* * * * *